ns patent Office                                2,999,025
                                                 Patented Sept. 5, 1961

2,999,025
CURING COMPOSITION FOR METALLIC COATINGS
James B. Cox, Houston, Tex., assignor, by mesne assignments, to Esso Research and Engineering Company, Elizabeth, N.J., a corporation of Delaware
No Drawing. Filed Dec. 15, 1958, Ser. No. 780,230
9 Claims. (Cl. 106—12)

The present invention is directed to a curing composition. More particularly, the invention is directed to a curing composition for finely-divided metal coatings. In its more specific aspects, the invention is concerned with a composition for curing finely-divided metal-silicate coatings.

The present invention may be briefly described as a composition for curing finely-divided metal-silicate coatings. The composition comprises a glycol, phosphoric acid and an aliphatic alcohol, the composition having a pH of approximately 3.

The glycol preferably has 2 to 4 carbon atoms but polyethylene glycols having molecular weights up to about 1,000 may be used. Exemplary of the preferred glycols are ethylene glycol, propylene glycol, and the butylene glycols.

The phosphoric acid is preferably orthophosphoric acid but may be any of the phosphoric acids having a strength from about 80% to about 100% $H_3PO_4$.

The aliphatic alcohol is preferably isopropyl alcohol, but alcohols having 3 to 4 carbon atoms in the molecule may also be used such as the butyl alcohols and n-propyl alcohol.

The composition may suitably comprise from about 30% to about 40% by volume of ethylene glycol, from about 10% to about 20% by volume of orthophosphoric acid and from about 50% to about 60% by volume of isopropyl alcohol.

The invention will be further illustrated by the following examples in which a zinc-silicate coating was prepared and applied to a ferrous metal surface. The following example illustrates the practice of the present invention. A vehicle was prepared by mixing water and ammonium bicarbonate in a ratio of 150 parts of water to 1 part of ammonium bicarbonate by weight. Sodium silicate was then added until a specific gravity of 1.3 was obtained. The vehicle was then mixed intimately with finely-divided zinc particles in a ratio of 1 part vehicle to 3 parts of zinc by weight. This mixture was then sprayed on a clean ferrous metal surface and allowed to stand at room temperature of about 77° F. for three hours, during which time drying took place. The coating on the ferrous metal surface was then cured by applying a spray of a composition composed of ethylene glycol, phosphoric acid, and isopropyl alcohol having a pH of about 3. This curing solution rendered the coating insoluble, abrasive resistant, and the cured coating had excellent cathodic properties. The curing composition appeared to form with the coating silicated sodium phosphate carbonate. This improves the coating substantially, giving it desirable abrasive properties.

In other examples, the curing composition was applied to a similar zinc-silicate coating with excellent results. The cured coating withstood contact with salt spray, giving excellent protection.

A curing composition was formed composed of 100 volumes of ethylene glycol, 30 volumes of 85% orthophosphoric acid, and 150 volumes of 99% isopropyl alcohol.

Another curing composition consisted of 100 volumes of ethylene glycol, 50 volumes of 85% orthophosphoric acid, and 150 volumes of isopropyl alcohol.

The composition of the present invention may have added to it a small but sufficient amount of a thickening agent such as a high molecular weight polymer of ethylene oxide known to the trade as "Polyox." This high molecular weight polymer is a solid but is soluble in the glycols and the aliphatic alcohol employed in the present invention. This high molecular weight polymer of ethylene oxide improves curing by insuring a satisfactory curing film necessary to the metallic coating such as zinc coating. It also thickens the curing solution considerably and keeps it from dripping and running from vertical surfaces and overhead areas. The high molecular weight polymer of ethylene oxide does not impair the setting properties of the glycol.

The "Polyox" has a molecular weight in excess of about 2,000 and has a melting point of 66° C., is nonflammable, is heat and acid stable, is resistant to oils and gases that might contact the coating before curing and has a high thickening efficiency in dilute solutions.

The amount of "Polyox" may range from about 0.5 to about 5 percent by weight of the composition.

Other thickening agents may be used in the practice of the present invention, in similar amounts, but it is preferred to employ the "Polyox." Exemplary of other thickening agents may be mentioned methyl-ethyl cellulose, hydroxyethyl cellulose, ethyl cellulose, and the like. It would be preferred, however, to use the high molecular weight polymer of ethylene oxide.

A composition containing "Polyox" in 1% by weight in accordance with the present invention has been used quite satisfactorily in curing about 50,000 square feet of the zinc coating.

The composition of the present invention imparts improved properties to finely-divided metal-silicate coatings in curing same. Heretofore, such coatings have been cured with solutions of calcium chloride, magnesium chloride, and aqueous saline solutions having a pH between 4 and 8.5. The cured coatings produced by these curing agents are very brittle, have low impact resistance, and tend to blister and break away from the metal when the coated metal is exposed to severe corrosive atmosphere. The lack of prolonged protection is believed to be due in the case of the cured coating, employing a magnesium calcium chloride solution, to the hard film produced preventing the zinc particles in the coating from becoming attached to the metal, thus causing severe blisters and failures to occur when attacked by strong oxidizing elements.

In the present invention, the improved curing composition does not form a hard, brittle coating such as that formed with magnesium carbonate, for example, but allows the zinc to form a film by attaching itself directly to the ferrous metal. The silicated sodium carbonates and phosphates formed by applying the curing composition of the present invention are more pliable than the hard magnesium carbonate of the prior art and offers increased impact resistance and increased abrasive properties to be imparted to the cured coating. By providing a cured coating composition in which the zinc is plated on to the metal, improved cathodic properties are provided and increased protection is obtained. It is believed that the ethylene glycol, by having a slow evaporation rate, insures a continuous curing film to be maintained over the finely-divided metal-silicate coating. Further, its wetting properties wet the metallic film thoroughly and allow the phosphoric acid to react with all parts of the finely-divided metal-silicate coating. The phosphoric acid releases carbon dioxide from the ammonium bicarbonate and thus causes a hard abrasive-resistant, corrosion-resistant, insoluble coating to be formed on the ferrous metal.

While the coating which is cured in the practice of the present invention is preferably a finely-divided zinc-silicate coating, other finely-divided metals such as magnesium may be used in protecting ferrous metal surfaces.

The nature and objects of the present invention having been completely described and illustrated, what I wish to claim as new and useful and secure by Letters Patent is:

1. A composition for curing finely-divided metal-silicate coatings which consists essentially of from about 30% to about 40% by volume of glycol having 2 to 4 carbon atoms, from about 10% to about 20% by volume of phosphoric acid, and from about 50% to about 60% by volume of an aliphatic alcohol having 3 to 4 carbon atoms in the molecule, said composition having a pH of approximately 3.

2. A composition in accordance with claim 1 containing about 0.5 to about 5 percent by weight of a thickening agent.

3. A composition in accordance with claim 2 in which the thickening agent is a high molecular weight polymer of ethylene oxide.

4. A composition in accordance with claim 2 in which the thickening agent is methyl ethyl cellulose.

5. A composition in accordance with claim 2 in which the thickening agent is hydroxy ethyl cellulose.

6. A composition in accordance with claim 2 in which the thickening agent is ethyl cellulose.

7. A composition in accordance with claim 1 in which the phosphoric acid is orthophosphoric acid having a strength from about 80% to about 100% $H_3PO_4$.

8. A composition for curing finely-divided zinc-silicate coatings which consists essentially of from about 30% to about 40% by volume of ethylene glycol, from about 10% to about 20% by volume of orthophosphoric acid, and from about 50% to about 60% by volume of isopropyl alcohol, said composition having a pH of approximately 3.

9. A composition in accordance with claim 8 containing about 1% by weight of a thickening agent.

References Cited in the file of this patent
UNITED STATES PATENTS

| | | |
|---|---|---|
| 2,662,838 | Oven et al. | Dec. 15, 1953 |
| 2,884,329 | Jezl | Apr. 28, 1959 |